United States Patent Office 2,976,962
Patented Mar. 28, 1961

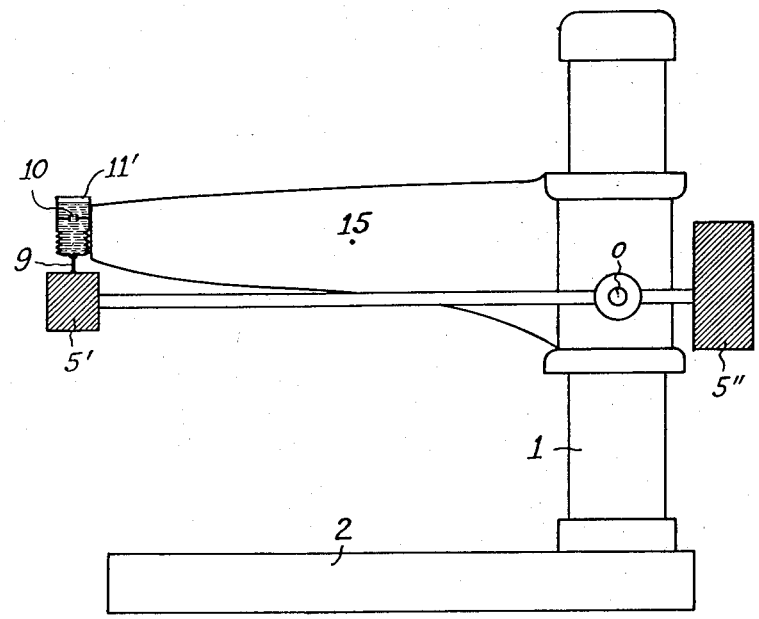

2,976,962

VIBRATION DAMPING DEVICE

Pierre Pegard, Courbevoie, France, assignor to Ateliers G.S.P., Courbevoie, France, a French society Filed Apr. 13, 1956, Ser. No. 578,106

Claims priority, application France Apr. 15, 1955

13 Claims. (Cl. 188—98)

The present invention relates to a device for damping vibrations through absorption of energy, which comprises a non-resilient semi-rigid connecting means between the vibrating member and an inert mass having no natural frequency.

Such device permits:

Deadening vibrations of machine parts while allowing said machine to be rigidly secured to its base (which property is particularly important with respect of machine tools which, in order to ensure accurate work, require that the frame be rigidly connected to the ground).

Deadening vibrations irrespective of their frequency.

In more general terms, said device makes it possible to deaden vibrations in some instances where conventional systems are inoperative.

The principle of the device according to the invention consists in absorbing the energy of the vibrating member in the interior of a member connecting the mass of the vibrating member with a mass which has no natural vibration period and is maintained in equilibrium in space. For this purpose, said mass is either fast with an assembly independent of the vibrating member, or connected with said vibrating member through substantially non-frictional bearing means such as a knee-joint, ball bearing, flexible tie or any other equivalent means that is not liable to impart vibrations from the vibrating member to the mass.

The invention will be more readily understood with reference to the ensuing description and accompanying drawing wherein:

Fig. 2 shows a further radial drilling-machine in which the mass used as a vibration damper is in indifferent equilibrium.

Figure 1:
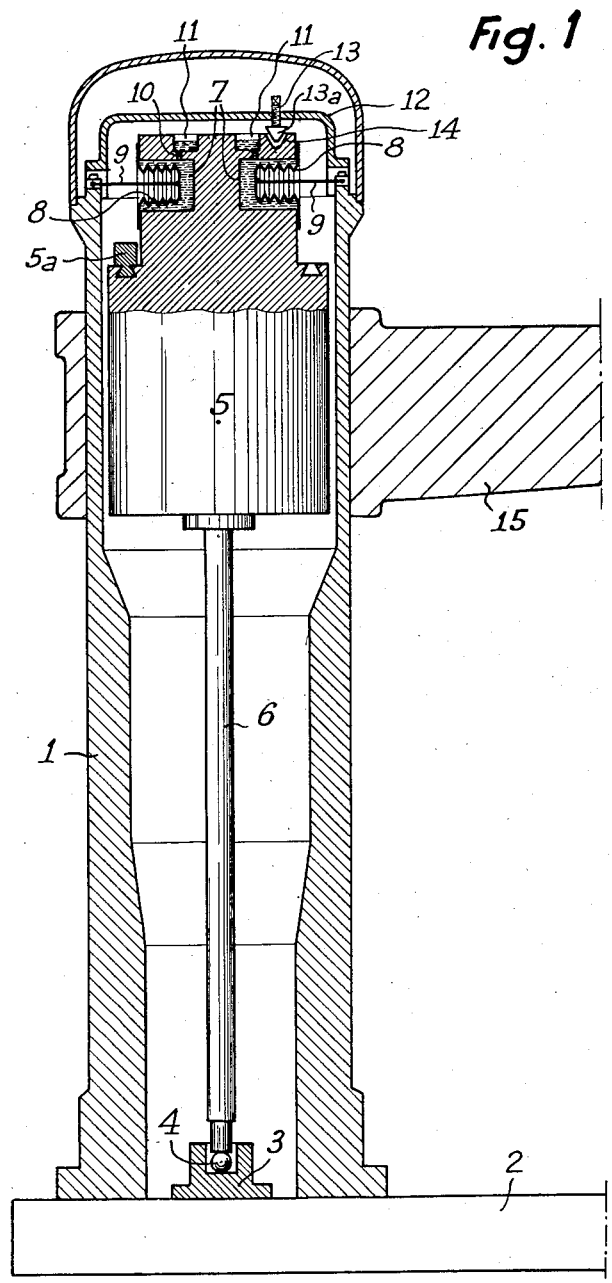
Fig. 1 shows in vertical cross-section the column of a radial drilling machine provided interiorly thereof with a vibration damper according to the invention.

In both constructions, the column 1 of the drilling machine is rigidly secured to the base 2, itself fixed in the ground. An arm 15 is rigidly connected in operation to said column 1 through a conventional locking means. In the construction of Fig. 1, the column 1 is provided interiorly with a bearing socket 3 fixed to the base, which supports, through the intermediary of a ball 4, a mass 5 rigidly mounted on a rod 6. One or more additional masses 5a movably mounted on the periphery of the mass 5, make it possible to obtain the indifferent equilibrium of the assembly comprising the members 5, 5a and 6.

The vibrating assembly comprising the column 1 and its arm 15 is connected to the mass 5 through bellows 8 extending into recesses 7 in the mass 5. The periphery of the bellows is fixed to said mass by a tight seal 8a. The bottom wall of the bellows is connected to the top of the column by rods 9. Each sealed pocket 7 communicates with an annular cup 11 through calibrated orifices 10, and adjustment of the rigidity of the connection is obtained by selecting the suitable diameter of said orifices.

The very low resiliency of the bellows imparts no natural frequency to the assembly comprising the mass and bellows, while centering the mass 5 in such a manner that it will have no direct contact with the column.

In order to allow the machine to be transported, one or more jacks 13 screwed in the cover 12 make it possible to render the connection between the mass and the column rigid by being adapted to engage recesses 14.

A fluid of any nature completely fills the pockets 7 and partially fills the circular cup 11. Hence the smallest vibration of the assembly comprising the column and arm, which tends to produce a relative motion of the mass 5 in respect of the column, causes a variation of the capacity of pockets 7 surrounding bellows 8. Such capacity variations cause in turn the fluid contained in said pockets to be sucked in and then forced back through the calibrated orifices 10 and hence energy is absorbed and the vibration is deadened. Thus, in the device described, there is provided a deformable non-elastic means which is defined by the chamber or pocket 7 of variable volume formed with a calibrated metering orifice 10 and filled with the fluid which I characterize as a deformable non-elastic body. Similarly, the device comprises a relatively weak elastic means defined by the bellows 8.

The same result might be attained by using in place of the semi-rigid hydraulic connecting means any similar means such as rubber shoes having a very low resiliency and an appropriate coefficient of internal damping.

In the construction of Fig. 2 the single mass 5 in unstable equilibrium has been replaced by two elementary masses 5' and 5" forming an assembly which is in indifferent equilibrium about a point 0 so selected that it will not be subjected to any vertical vibration. At least one of these masses is connected with the vibrating parts and especially with the end of the gantry 15 through hydraulic connecting means similar to those already described in Fig. 1. In the construction of Figure 2, the fluid is contained within the bellows and flows out at the upper part into a cavity 11'. The vibrations of the gantry 15 are deadened as in the previous instance by displacements of fluid through the calibrated orifices 10.

The invention that has been described by way of example as applied to machine-tools, may obviously be used in numerous other instances where it is desired to deaden vibrations.

What is claimed is:

1. A damping device for damping vibrations of a vibratory member, the vibration of which is to be damped comprising, in combination, an inert mass disposed in a static condition of equilibirium, means movably supporting said mass in equilibrium, an extensible and contractible bellows connected to said member and to said mass for extension and contraction thereof in dependence upon vibrational movement between the vibratory member and the mass, means defining a first liquid-filled chamber in conjunction with said bellows in which the volume thereof is increased or deceased in dependence upon the extension and contraction of said bellows, and including means defining a second chamber of constant volume and a flow path between said chambers having a calibrated orifice for providing controlled flow between said chamber in dependence upon an increase or decrease of the volume of said first chamber as a function of contraction and extension of said bellows.

2. A damping device for damping vibrations of a vibratory member, the vibration of which is to be damped comprising, in combination, an inert mass disposed in a static condition of neutral equilibrium, means movably supporting said mass in equilibrium, an extensible and contractible bellows connected to said member and to said mass for extension and contraction thereof in dependence upon vibrational movement between the member and the mass, said mass having a recess forming a first liquid-filled chamber in conjunction with said bellows in which the liquid containing volume thereof is increased or decreased in dependence upon the extension and contraction of said bellows, and said mass having a second recess defining a second chamber of constant volume and a flow path between said chambers having a calibrated orifice for providing controlled flow between said chambers in dependence upon an increase or decrease of the volume of said first chamber as a function of contraction and extension of said bellows.

3. A damping device for damping vibrations of a hollow vibratory member, the vibration of which is to be damped comprising, in combination, an inert mass disposed in a static condition of neutral equilibrium and disposed internally of said hollow member and radially spaced inwardly therefrom, means movably supporting said mass in equilibrium, said mass having side walls provided with two oppositely disposed recesses, a pair of extensible and contractible bellows disposed one each in each of said recesses extending inwardly thereof and each partially filling a corresponding recess, each bellows having a peripheral edge portion sealed to a corresponding side wall thereby closing the corresponding recess, said mass having a top portion provided with an annular recess and separate passageways providing communication between said annular recess and said other two recesses, said passageways having separate calibrated orifices to control fluid flow between the two recesses and said annular recess, a liquid filling said two oppositely disposed recesses, a rod for each bellows disposed axially thereof connecting the end of a corresponding bellows disposed inwardly of a recess and an inner wall of said vibratory member whereby the fluid containing volume of each oppositely disposed recess is increased or decreased in dependence upon the extension and contraction of said bellows in dependence upon vibrational movement between the vibratory member and said mass.

4. In a damping device for damping vibrations of a hollow vibratroy member, the vibration of which is to be damped comprising, in combination, an inert mass disposed in a static condition of neutral equilibrium and disposed internally of said hollow member and radially inwardly spaced therefrom, means movably supporting said mass in equilibrium, said mass having side walls provided with two oppositely disposed recesses, a pair of extensible and contractible bellows disposed one each in each of said recesses extending inwardly thereof and each partially filling a corresponding recess, each bellows having a peripheral edge portion sealed to a corresponding side wall thereby closing the corresponding recesses, said mass having a top portion provided with an annular recess and separate passageways providing communication between said annular recess and said other two recesses, said passageways having separate calibrated orifices to control fluid flow between the two recesses and said annular recess, a liquid filling said two oppositely disposed recesses, a rod for each bellows disposed axially thereof connecting the end of a corresponding bellows disposed inwardly of a recess and an inner wall of said member whereby the fluid containing volume of each oppositely disposed recess is increased or decreased in dependence upon the extension and contraction of said bellows in dependence upon vibrational movement between the member and said mass, and means operable at will to retain said mass in fixed position relative to the vibratory member thereby to render ineffective the damping device.

5. A damping device for damping vibrations of a vibratory member, the vibration of which is to be damped comprising, in combination, an inert mass disposed in a static condition of equilibrium, means movably supporting said mass in equilibrium, said mass having a recess forming a first liquid-filled chamber, said mass having a second recess defining a second chamber of constant volume and a flow path between said chambers having a calibrated orifice for providing controlled flow between said chambers in dependence upon fluid flow out of and into said first chamber, means reciprocable in the first chamber connecting the mass and vibratory member for causing fluid flow between the two chambers in dependence upon vibrational movement between the vibratory member and said mass.

6. A device for damping the vibrations of a member connected to a stationary machine normally vibrating when in operation and causing simultaneous vibration of said member comprising, in combination, an inert mass, means oscillatably supporting said mass in equilibrium so that it does not possess a natural frequency of oscillation, deformable non-elastic means, said deformable means comprising at least one chamber of variable volume containing a deformable non-elastic body and provided with a calibrated metering orifice to permit controlled flow of said non-elastic body to and from said chamber, connecting means connecting said deformable means to said member and to said mass and acting on said deformable means to deform said deformable means in correspondence to the relative spatial position between said mass and said member, said deformable means being effective to dissipate the energy of the relative motion of the vibrating member through the flow of said deformable non-elastic body.

7. A damping device as defined in claim 6, wherein said supporting means supports said mass in unstable equilibrium.

8. A damping device as defined in claim 6, wherein said supporting means supports said mass in neutral equilibrium.

9. A damping device as defined in claim 6, wherein said deformable body is a liquid filling said chamber.

10. A damping device as defined in claim 9, wherein said chamber comprises a bellows connected to the connecting means.

11. A device for damping the vibration of a hollow machine frame mounted on a base comprising an inert mass disposed inside said hollow frame and out of direct contact with said frame, means oscillatably supporting said mass in a position of equilibrium so that it has no natural frequency of oscillation, deformable non-elastic means, connecting means connected between said frame and said mass and acting on said deformable means to deform said deformable means in correspondence to the relative relationship between the mass and the frame, said deformable means being effective to dissipate the energy of the relative motion of the vibrating frame through deformation of said deformable means.

12. A device as defined in claim 11, wherein said deformable means comprises a chamber, liquid filling said chamber, a displaceable element movable in said chamber, and means connecting said displaceable element with said frame.

13. A device as defined in claim 12, wherein said displaceable element comprises a bellows having a peripheral edge portion sealed to the wall of said chamber.

References Cited in the file of this patent

UNITED STATES PATENTS

| | | |
|---|---|---|
| 1,965,224 | Ernst et al. | July 3, 1934 |
| 2,317,028 | Chappell et al. | Apr. 20, 1943 |
| 2,674,096 | Marshall | Apr. 6, 1954 |
| 2,688,150 | Roussel | Sept. 7, 1954 |
| 2,715,951 | Lieber | Aug. 23, 1955 |

FOREIGN PATENTS

| | | |
|---|---|---|
| 482,402 | France | Dec. 22, 1916 |
| 642,711 | France | May 6, 1928 |
| 1,055,999 | France | Oct. 21, 1953 |
| 1,087,734 | France | Aug. 25, 1954 |